United States Patent
Wu et al.

(10) Patent No.: US 11,638,164 B2
(45) Date of Patent: Apr. 25, 2023

(54) WIRELESS SIGNAL TRANSCEIVER

(71) Applicant: HTC Corporation, Taoyuan (TW)

(72) Inventors: Chun-Yih Wu, Taoyuan (TW);
Ta-Chun Pu, Taoyuan (TW);
Yen-Liang Kuo, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 17/577,023

(22) Filed: Jan. 17, 2022

(65) Prior Publication Data
US 2022/0345902 A1    Oct. 27, 2022

Related U.S. Application Data

(60) Provisional application No. 63/178,538, filed on Apr. 23, 2021.

(51) Int. Cl.
| | |
|---|---|
| *H04W 16/28* | (2009.01) |
| *H04B 7/06* | (2006.01) |
| *H01Q 19/06* | (2006.01) |
| *H01Q 3/46* | (2006.01) |

(52) U.S. Cl.
CPC ............ *H04W 16/28* (2013.01); *H01Q 3/46* (2013.01); *H01Q 19/062* (2013.01); *H04B 7/0617* (2013.01)

(58) Field of Classification Search
CPC ......... H01Q 19/06; H01Q 19/08; H01Q 3/00; H01Q 3/46; H01Q 19/062; H04W 16/28; H04B 7/0617
See application file for complete search history.

(56) References Cited

U.S. PATENT DOCUMENTS

| | | | | |
|---|---|---|---|---|
| 2012/0249388 | A1* | 10/2012 | Hansen | H01Q 1/2266 343/753 |
| 2020/0194877 | A1 | 6/2020 | Choi | |
| 2021/0066798 | A1* | 3/2021 | Kwak | H01Q 19/062 |
| 2022/0190482 | A1* | 6/2022 | Yang | H01Q 19/062 |

FOREIGN PATENT DOCUMENTS

| | | |
|---|---|---|
| CN | 112103662 | 12/2020 |

OTHER PUBLICATIONS

Asus. Facebook post for Lyra Trio, dated Sep. 17, 2018. Retrieved on Nov. 19, 2022 from https://www.facebook.com/ASUS/photos/a.186749591368447/1952796871430368 (Year: 2018).*

TP-link. TGR 1900 Onhub router product page. Publically accessible as early as Dec. 10, 2020 according toweb.archive.org (Wayback machine). Retrieved on Nov. 19, 2022 from https://www.tp-link.com/us/home-networking/wifi-router/tgr1900/ (Year: 2020).*

"Office Action of Taiwan Counterpart Application", dated Aug. 11, 2022, p. 1-p. 10.

* cited by examiner

*Primary Examiner* — David S Huang
(74) *Attorney, Agent, or Firm* — JCIPRNET

(57) ABSTRACT

A wireless signal transceiver includes a main body part, an antenna array, and a refraction element. The antenna array is disposed in the main body part, and is configured to transmit or receive at least one wireless signal beam. The refraction element is disposed at a first end of the main body part, and the first end is opposite to the antenna array. The refraction element is used to receive the wireless signal beam and refracts the wireless signal beam to generate and transmit a plurality of outputted wireless signal beams.

11 Claims, 5 Drawing Sheets

WIRELESS SIGNAL TRANSCEIVER

CROSS-REFERENCE TO RELATED APPLICATION

This application claims the priority benefit of U.S. provisional application Ser. No. 63/178,538, filed on Apr. 23, 2021. The entirety of the above-mentioned patent application is hereby incorporated by reference herein and made a part of this specification.

BACKGROUND

Technical Field

The invention relates to a wireless signal transceiver, and in particular relates to a wireless signal transceiver capable of expanding a beam emission angle.

Description of Related Art

In conventional wireless signal transceivers, an antenna array on a millimeter wave transmitter usually has the capability of beamforming to change a transmission and reception angle of the millimeter wave transceiver. However, a range of the maximum adjustable beam angle depends on the product of an element factor and an array factor (the element factor and the array factor are combined to form a total antenna pattern). Therefore, a conventional antenna array has a certain limitation on adjustment of the beam angle. When applied to an access point (AP) transmission device, multiple wireless signal transceivers are usually required in order to realize an omnidirectional coverage angle. Under this circumstance, since the number of the required wireless signal transceivers will increase, the product cost, circuit design, and mechanism complexity will thereby be increased.

SUMMARY

The invention provides a wireless signal transceiver, which can enhance a horizontal coverage of a wireless signal beam.

The invention provides a wireless signal transceiver, including a main body part, an antenna array, and a refraction element. The antenna array is disposed in the main body part and is configured to transmit at least one wireless signal beam. The refraction element is disposed at a first end of the main body part, opposite to the antenna array. When the wireless signal beam emitted by the antenna array on the wireless signal transceiver is refracted by the refraction element, a path of the wireless signal beam is changed to a predetermined direction, especially a vertical radiation is changed to a horizontal radiation. Based on the above, the wireless signal transceiver of the invention can expand the emission angle of the outputted wireless signal beam through a function of the refraction element. In this way, under the premise that multiple wireless signal transceivers are not required to be provided, an access point transmission device can also realize an omnidirectional coverage angle for wireless signal transmission, which can reduce the product cost and simplify the circuit design and mechanism complexity of an electronic device.

DESCRIPTION OF THE EMBODIMENTS

Figure 1:
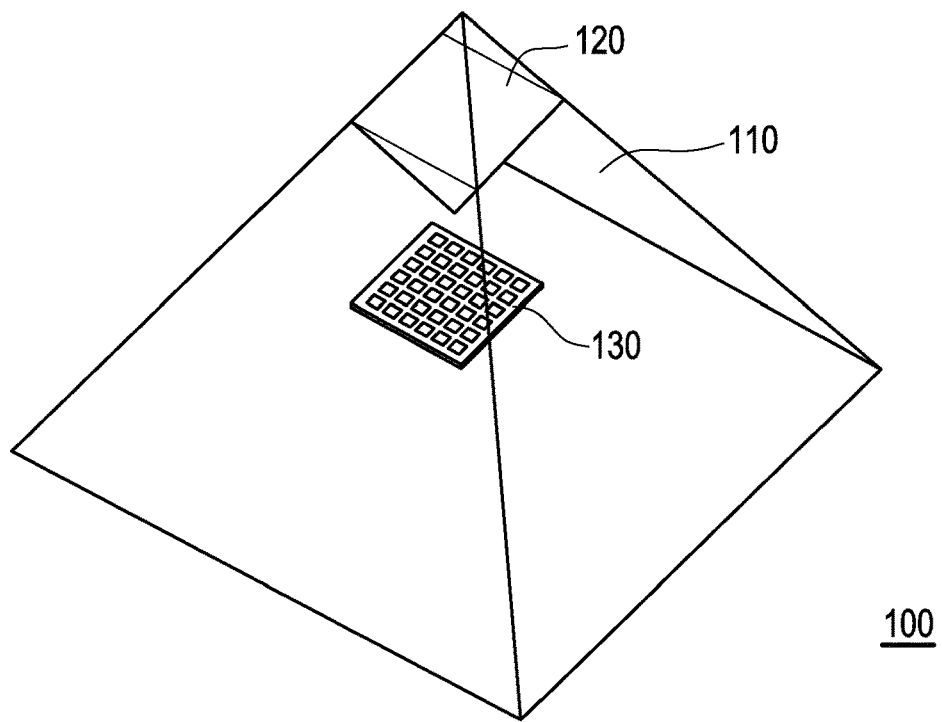
FIG. 1 is a three-dimensional schematic view of a wireless signal transceiver according to an embodiment of the invention.

Please refer to FIG. 1. FIG. 1 is a three-dimensional schematic view of a wireless signal transceiver according to an embodiment of the invention. A wireless signal transceiver 100 includes a main body part 110, a refraction element 120, and an antenna array 130. In the embodiment, the main body part 110 may be a pyramid (for example, a quadrangular pyramid) and may be made of a plastic material. The refraction element 120 may be disposed at one end of the main body part 110. For example, the refraction element 120 may be disposed at a top corner of the main body part 110 which is a pyramid. The antenna array 130 may be disposed in the main body part 110 and may be opposite to the refraction element 120.

Figure 2:
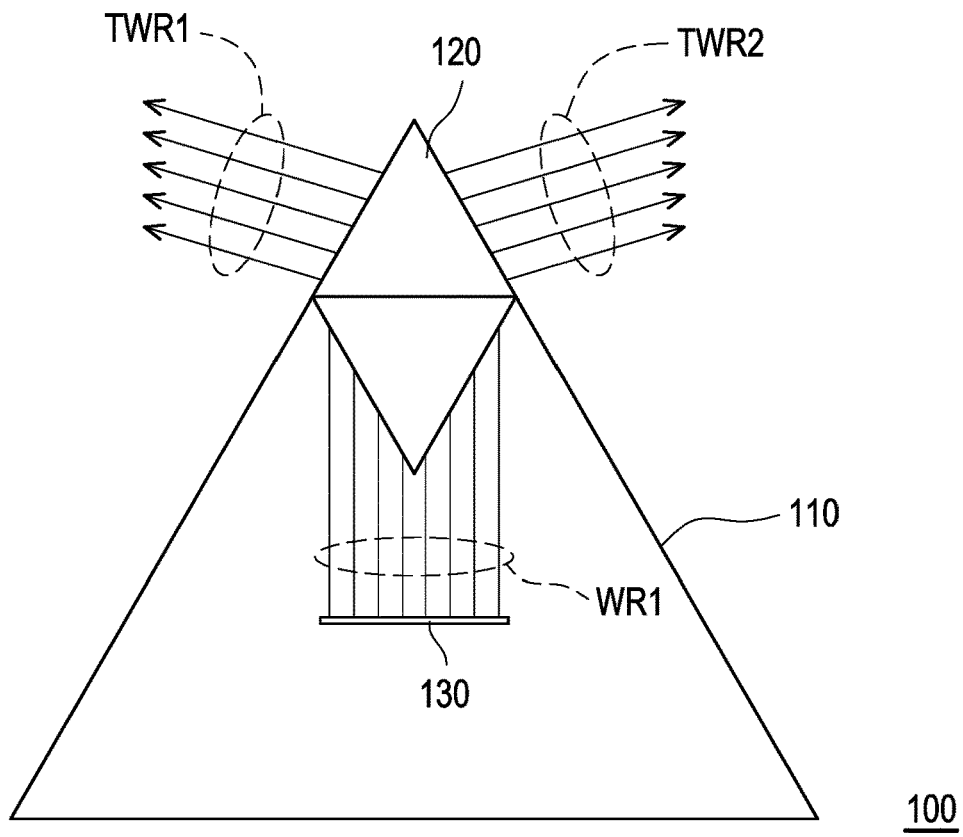
FIG. 2 is a side view of a wireless signal transceiver 100 according to the embodiment of the invention.

The antenna array 130 may be configured to transmit and receive one or more wireless signal beams. The wireless signal beam may be transmitted to the refraction element 120. The refraction element 120 is configured to refract the wireless signal beam to generate specific multiple corresponding wireless signal beam directions, which facilitates wireless signal transmission in specific directions. Please refer to FIG. 2 together with FIG. 1. FIG. 2 is a side view of the wireless signal transceiver 100 according to the embodiment of the invention. In FIG. 2, the refraction element 120 is disposed above the antenna array 130. The antenna array 130 may emit wireless signal beams at different angles (not shown in FIG. 2) to the refraction element 120. A wireless signal beam WR1 is the wireless signal beam emitted directly upward by the antenna array 130. The refraction element 120 may refract the wireless signal beam WR1 to generate multiple outputted wireless signal beams TWR1, TWR2, TWR3, and TWR4 (TWR3 and TWR4 are not shown in FIG. 2), and the outputted wireless signal beams TWR1, TWR2, TWR3, and TWR4 are respectively sent out toward four sides of the wireless signal transceiver 100 to cover 360 degrees of the device. An included angle formed by a transmission direction of the wireless signal beam WR1 and a transmission direction of the outputted wireless signal beam TWR1 is greater than 45 degrees and favorably ranges from 80 degrees to 100 degrees. Similarly, an included angle formed by the transmission direction of the wireless signal beam WR1 and a transmission direction of the outputted wireless signal beam TWR2 is greater than 45 degrees and favorably ranges from 80 degrees to 100 degrees.

In this way, it can be seen that the wireless signal transceiver 100 of the invention can deflect the wireless signal beam WR1 emitted directly upward by the antenna array 130 through the refraction element 120 to generate the outputted wireless signal beams TWR1 and TWR2 sent out toward two sides of the wireless signal transceiver 100, which enables the wireless signal transceiver 100 to achieve an effect of beam coverage in a horizontal direction.

It is worth mentioning that, in the embodiment, a distance between the antenna array 130 and the refraction element 120 may be greater than 10 times a wavelength of the wireless signal beam WR1.

Furthermore, the refraction element 120 in the embodiment of the invention may be an octagonal prism structure. The material constituting the refraction element 120 may be an acrylic fiber, cellulose acetate, epoxy resin, high-density polyethylene (HDPE), polycarbonate, polytetrafluoroethylene (PTFE), polyester, polystyrene, or vinylidene chloride, and the material constituting the refraction element 120 has a refractive index from 1.35 to 1.63.

Figure 3A:
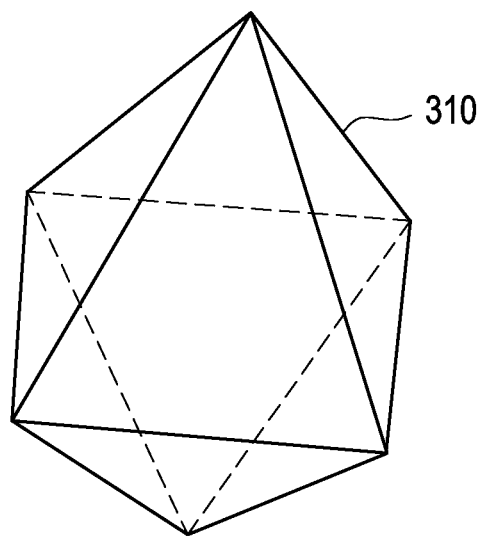
FIG. 3A and FIG. 3B are schematic views respectively illustrating a shape of a refraction element and a corresponding beam transmission path according to an embodiment of the invention.
Figure 3B:
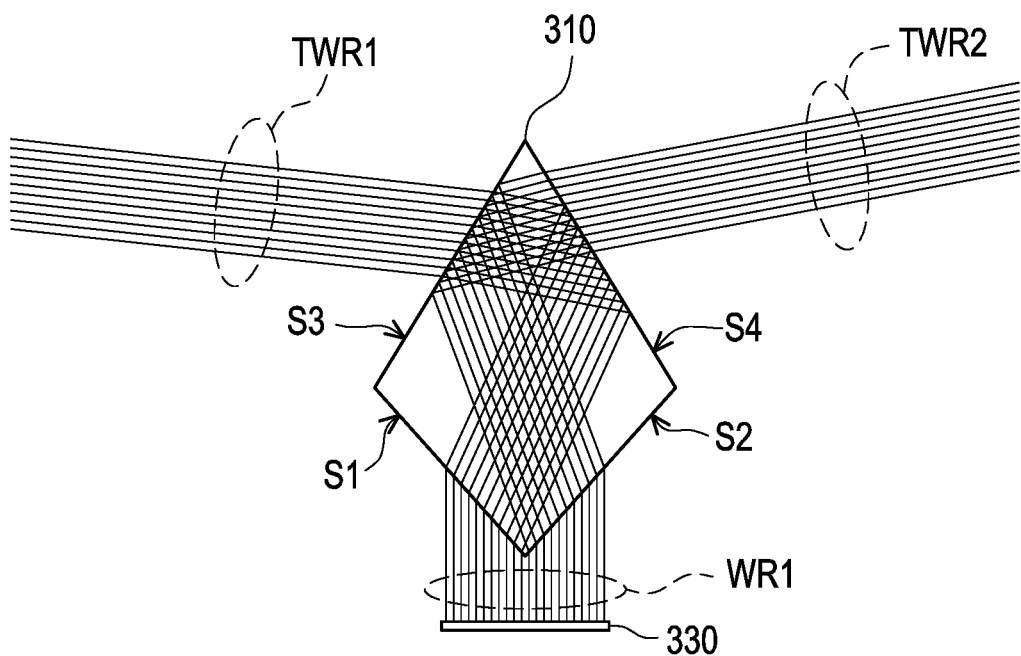

Please refer to FIG. 3A and FIG. 3B below. FIG. 3A and FIG. 3B are schematic views respectively illustrating a shape of a refraction element and a corresponding beam transmission path according to an embodiment of the invention. In FIG. 3A, a refraction element 310 may be a convex octahedron structure. In FIG. 3B, the refraction element 310 may receive a wireless signal beam WR1 emitted by the antenna array 330. The refraction element 310 refracts the wireless signal beam WR1 through surfaces S1 and S2 to enable the wireless signal beam WR1 to focus. Through the above focusing, the wireless signal beam WR1 may be split into two portions, which are respectively reflected by surfaces S3 and S4 of the refraction element 310 to respectively generate outputted wireless signal beams TWR2 and TWR1 to be transmitted out of the refraction element 310. Transmission directions of the wireless signal beam WR1 and the outputted wireless signal beams TWR2 and TWR1 have a certain angular deviation.

Figure 4A:
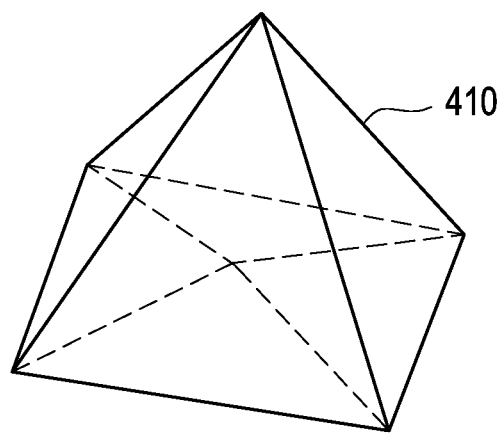
FIG. 4A and FIG. 4B are schematic views respectively illustrating a shape of a refraction element and a corresponding beam transmission path according to an embodiment of the invention.
Figure 4B:
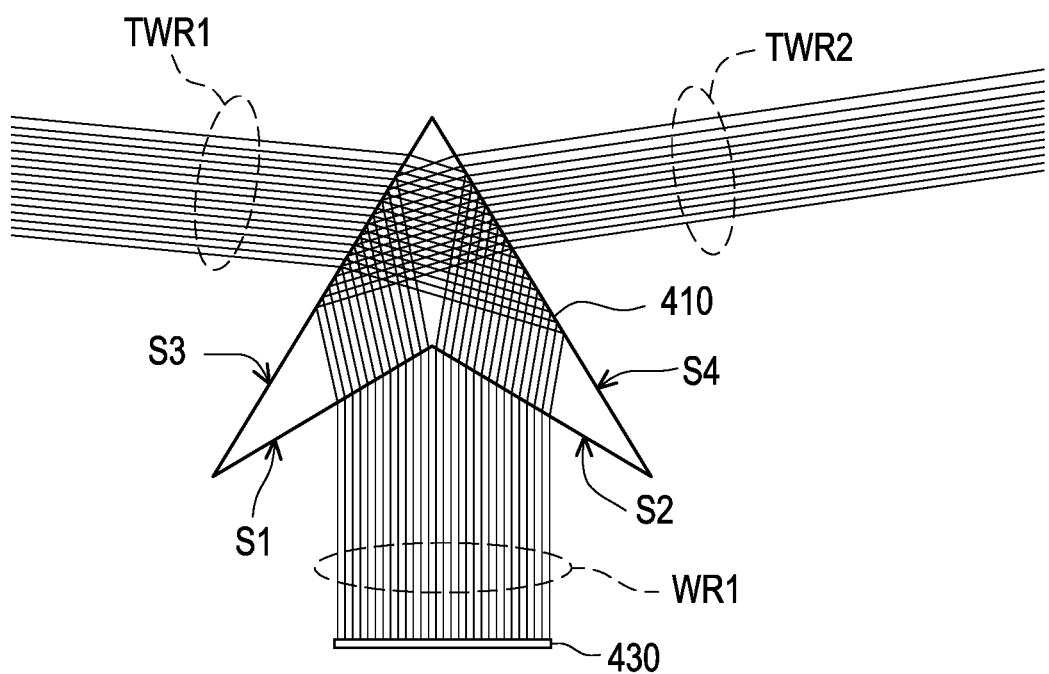

Please refer to FIG. 4A and FIG. 4B below. FIG. 4A and FIG. 4B are schematic views respectively illustrating a shape of a refraction element and a corresponding beam transmission path according to an embodiment of the invention. In FIG. 4A, a refraction element 410 may be a concave octahedron structure. In FIG. 4B, the refraction element 410 may receive a wireless signal beam WR1 emitted by an antenna array 430. The refraction element 410 refracts the wireless signal beam WR1 through surfaces S1 and S2 to enable the wireless signal beam WR1 to defocus. Through the above defocusing, the wireless signal beam WR1 may be split into two portions, which are respectively reflected by surfaces S3 and S4 of the refraction element 410 to respectively generate outputted wireless signal beams TWR2 and TWR1 to be transmitted out of the refraction element 410. Transmission directions of the wireless signal beam WR1 and the outputted wireless signal beams TWR2 and TWR1 have a certain angular deviation.

The antenna array 430 may emit the wireless signal beams at different angles to the refraction element 410, which enables beam directions to be respectively directed to the surface S1 or S2 by phase control.

Figure 5:
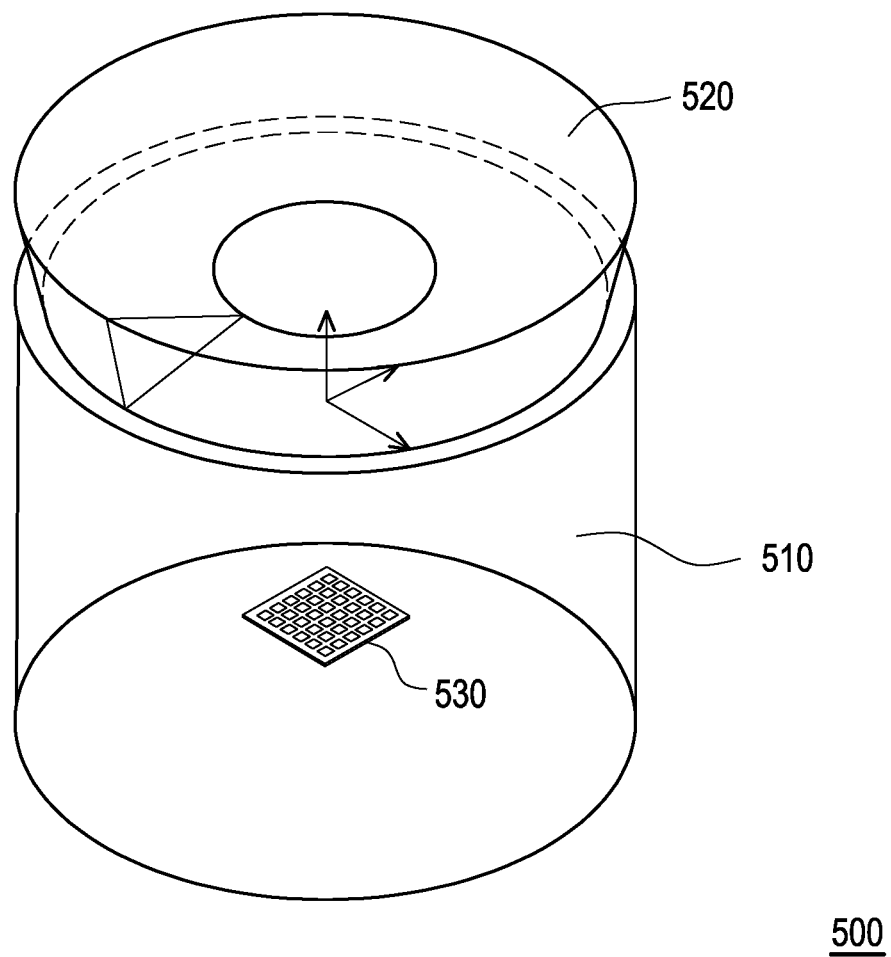
FIG. 5 is a three-dimensional schematic view of a wireless signal transceiver according to another embodiment of the invention.

Please refer to FIG. 5. FIG. 5 is a three-dimensional schematic view of a wireless signal transceiver according to another embodiment of the invention. The wireless signal transceiver 500 includes a main body part 510, a refraction element 520, and an antenna array 530. In the embodiment, the main body part 510 may be a cannular structure and may be made of a plastic material. The refraction element 520 may be disposed at one end of the main body part 510. For example, the refraction element 520 may be disposed at an upper end of the main body part 510 which is a cannular structure. The antenna array 530 may be disposed in the main body part 510 and may be opposite to the refraction element 520.

Figure 6:
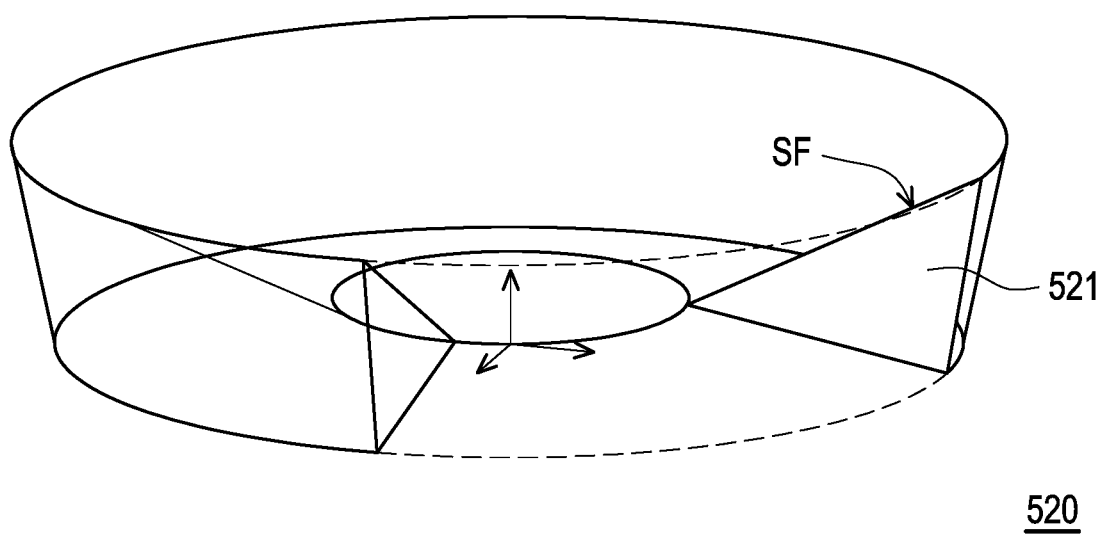
FIG. 6 is a perspective schematic view of a refraction element 520 according to the embodiment of FIG. 5.

In the embodiment, the refraction element 520 has an annular structure and is disposed on a top edge of the main body part 510. Please refer to FIG. 6, which is a perspective schematic view of the refraction element 520 according to the embodiment of FIG. 5. On the annular structure of the refraction element 520, an inward surface SF is an inclined surface, and the shape of the refraction element 520 on a vertical section may be a triangle 521. In the embodiment, the refraction element 520 may have an opening therein. The opening may be configured to set peripheral equipment such as indicators, microphones, etc.

The material constituting the refraction element 520 may be an acrylic fiber, cellulose acetate, epoxy resin, high-density polyethylene (HDPE), polycarbonate, polytetrafluoroethylene (PTFE), polyester, polystyrene, or vinylidene chloride, and the material constituting the refraction element 520 may have a refractive index from 1.35 to 1.63.

The same as the foregoing embodiments, in the embodiment, a distance between the refraction element 520 and the antenna array 530 may be greater than 10 times a wavelength of the wireless signal beam sent by the antenna array 530.

Figure 7:
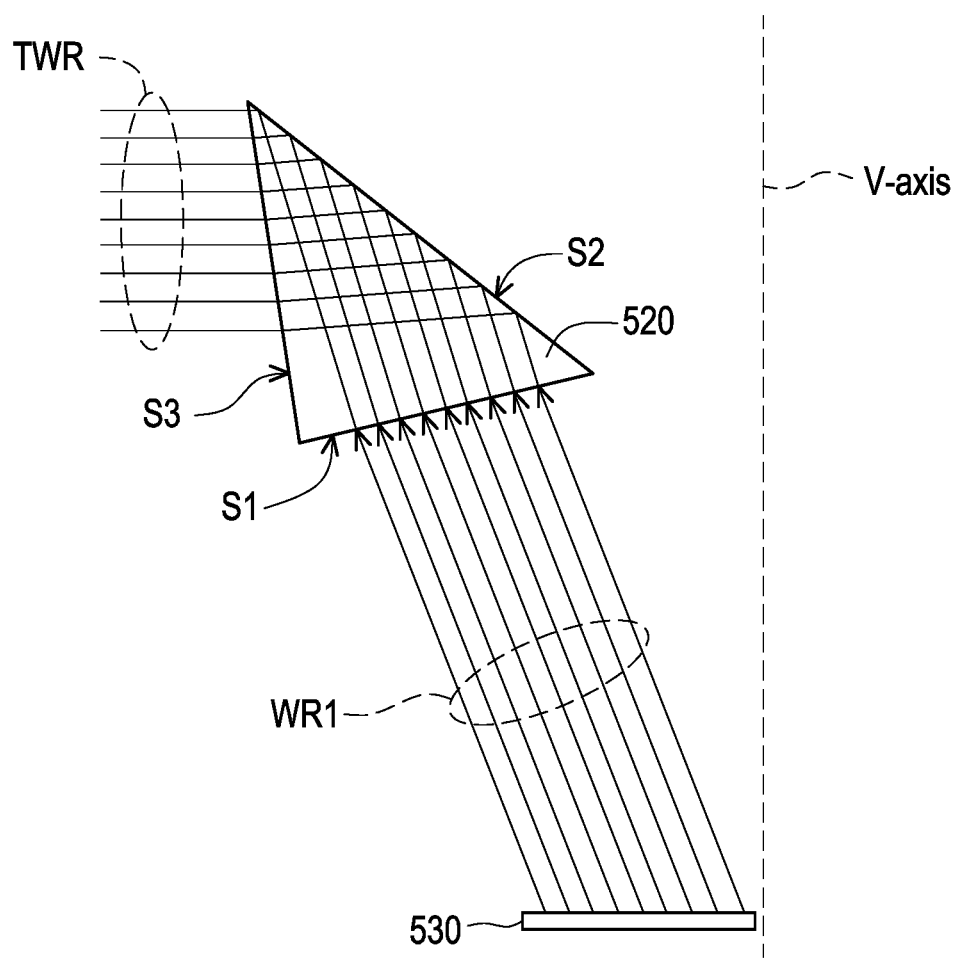
FIG. 7 is a schematic view of a path of a wireless signal beam of the wireless signal transceiver according to the embodiment of FIG. 5.

A transmission path of the wireless signal beam in the embodiment may be understood from FIG. 7, which is a schematic view of a path of a wireless signal beam of the wireless signal transceiver according to the embodiment of FIG. 5. In FIG. 7, the antenna array 530 may transmit a wireless signal beam WR1 to the refraction element 520. The wireless signal beam WR1 penetrates a first surface S1 of the refraction element 520, and is reflected by a second surface S2 of the refraction element 520. The reflected wireless signal beam is refracted by a third surface S3 of the refraction element 520 to generate an outputted wireless signal beam TWR.

According to FIG. 7, it can be seen that the outputted wireless signal beam TWR generated by the wireless signal transceiver 500 may be transmitted out of a side of the wireless signal transceiver 500 in a 360-degree omnidirectional manner through the annular structure of the refraction element 520 to achieve the effect of the beam coverage in the horizontal direction.

Incidentally, in the embodiment, there is an included angle between a transmission direction of the wireless signal beam WR1 emitted by the antenna array 530 and a vertical axis V-axis of the antenna array 530, and the included angle may range from 20 degrees to 40 degrees. For example, the included angle may be 30 degrees.

In summary of the above, the wireless signal transceiver of the invention transmits the wireless signal beam to the refraction element located at the upper end of the wireless signal transceiver, and deflects the wireless signal beam through the refraction element to emit the wireless signal beam from the side of the wireless signal transceiver. In this way, the wireless signal beam can be deflected at a large angle to be transmitted to the horizontal direction, and the horizontal coverage of the wireless signal can be enhanced,

What is claimed is:
1. A wireless signal transceiver, comprising:
a main body part;
an antenna array, disposed in the main body part and configured to transmit at least one wireless signal beam; and a refraction element, disposed at a first end of the main body part and opposite to the antenna array,
wherein the refraction element is configured to transmit or receive the at least one wireless signal beam and refract the at least one wireless signal beam to generate and transmit a plurality of outputted wireless signal beams,
wherein a distance between the antenna array and the refraction element is greater than 10 times a wavelength of the at least one wireless signal beam.

2. The wireless signal transceiver according to claim 1, wherein the main body part is a pyramid.

3. The wireless signal transceiver according to claim 2, wherein the refraction element has a prism structure and is disposed on a top corner of the pyramid.

4. The wireless signal transceiver according to claim 3, wherein the refraction element first focuses the at least one wireless signal beam to generate a plurality of sub beams, and then the refraction element reflects and refracts the sub beams to respectively generate the outputted wireless signal beams.

5. The wireless signal transceiver according to claim 3, wherein the refraction element first defocuses the at least one wireless signal beam to generate a plurality of sub beams, and then the refraction element reflects and refracts the sub beams to respectively generate the outputted wireless signal beams.

6. The wireless signal transceiver according to claim 1, wherein the main body part has a cannular structure.

7. The wireless signal transceiver according to claim 6, wherein the refraction element has an annular structure and is disposed on a top edge of the main body part, and an inward surface of the annular structure is an inclined surface.

8. The wireless signal transceiver according to claim 7, wherein a shape of a vertical section of the refraction element is a triangle.

9. The wireless signal transceiver according to claim 6, wherein an included angle is formed between an emission direction of the at least one wireless signal beam transmitted by the antenna array and a vertical axis of the main body part, wherein the included angle ranges from 20 degrees to 40 degrees.

10. The wireless signal transceiver according to claim 6, wherein a material of the refraction element is an acrylic fiber, cellulose acetate, epoxy resin, high-density polyethylene, polycarbonate, polytetrafluoroethylene, polyester, polystyrene, or vinylidene chloride.

11. The wireless signal transceiver according to claim 1, wherein a transmission direction of each of the outputted wireless signal beams and a transmission direction of the wireless signal beam have an angular deviation.

* * * * *